(12) United States Patent
Bousfield et al.

(10) Patent No.: US 11,629,668 B2
(45) Date of Patent: *Apr. 18, 2023

(54) HIGH PRESSURE RATIO GAS TURBINE ENGINE

(71) Applicant: ROLLS-ROYCE PLC, London (GB)

(72) Inventors: Ian J Bousfield, Derby (GB); Michael O Hales, Derby (GB); Rory D Stieger, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/196,546

(22) Filed: Mar. 9, 2021

(65) Prior Publication Data

US 2021/0301719 A1    Sep. 30, 2021

(30) Foreign Application Priority Data

Mar. 26, 2020  (GB) ........................................ 2004382
Mar. 26, 2020  (GB) ........................................ 2004384
(Continued)

(51) Int. Cl.
*F02C 3/06*    (2006.01)
*F02K 3/06*    (2006.01)
(Continued)

(52) U.S. Cl.
CPC .................. *F02K 3/06* (2013.01); *F02C 3/06* (2013.01); *F02C 7/36* (2013.01); *F02C 3/107* (2013.01);
(Continued)

(58) Field of Classification Search
CPC ...... F02K 3/06; F02C 3/06; F02C 7/36; F02C 3/107; F02C 9/18; F05D 2220/3216;
(Continued)

(56) References Cited

U.S. PATENT DOCUMENTS 3,956,887 A    5/1976   MacDonald
4,976,102 A   12/1990   Taylor
(Continued)

FOREIGN PATENT DOCUMENTS

EP    3 372 808 A2    9/2018
EP    3 376 011 A1    9/2018
(Continued)

OTHER PUBLICATIONS

Inlet Mach Number—an overview Science-Direct Topics (Year: 2014).*
(Continued)

*Primary Examiner* — Shafiq Mian
(74) *Attorney, Agent, or Firm* — Oliff PLC

(57) ABSTRACT

A gas turbine engine including: a high pressure turbine, a low pressure turbine, a high pressure compressor coupled to the high pressure turbine by a high pressure shaft, a propulsor and a low pressure compressor coupled to the low pressure turbine via a low pressure shaft and a reduction gearbox; wherein the high pressure compressor defines an average stage pressure ratio at cruise conditions of between 1.25 and 1.35 and consists of 10 or 11 stages; and the high pressure compressor and low pressure compressor together define a core overall pressure ratio at cruise conditions of between 40:1 and 60:1.

8 Claims, 8 Drawing Sheets

(30) Foreign Application Priority Data

Mar. 26, 2020 (GB) .................................... 2004385
Mar. 26, 2020 (GB) .................................... 2004386
Mar. 26, 2020 (GB) .................................... 2004387

(51) Int. Cl.
  *F02C 7/36* (2006.01)
  *F02C 3/107* (2006.01)
  *F02C 9/18* (2006.01)

(52) U.S. Cl.
  CPC .......... *F02C 9/18* (2013.01); *F05D 2220/323* (2013.01); *F05D 2220/3216* (2013.01); *F05D 2240/60* (2013.01); *F05D 2260/40311* (2013.01)

(58) Field of Classification Search
  CPC .......... F05D 2220/323; F05D 2240/60; F05D 2260/40311
  See application file for complete search history.

(56) References Cited

U.S. PATENT DOCUMENTS

| | | | |
|---|---|---|---|
| 5,042,245 | A | 8/1991 | Zickwolf, Jr. |
| 6,312,221 | B1* | 11/2001 | Yetka .................. F01D 5/143 415/222 |
| 11,047,303 | B2 | 6/2021 | Mardjono et al. |
| 2003/0056580 | A1* | 3/2003 | Sawada .................. G01M 9/04 73/147 |
| 2012/0198816 | A1 | 8/2012 | Suciu et al. |
| 2013/0202415 | A1 | 8/2013 | Karl et al. |
| 2013/0223986 | A1* | 8/2013 | Kupratis ................ F02C 7/36 415/115 |
| 2016/0319829 | A1* | 11/2016 | McCune ............... F16H 57/028 |
| 2018/0058246 | A1 | 3/2018 | Keenan |
| 2018/0230912 | A1* | 8/2018 | Hasel .................... F02C 7/36 |
| 2019/0048826 | A1* | 2/2019 | Pointon ................. F02C 7/36 |
| 2020/0040845 | A1 | 2/2020 | Swift |

FOREIGN PATENT DOCUMENTS

| | | |
|---|---|---|
| EP | 3 444 468 A1 | 2/2019 |
| EP | 3 546 737 A1 | 10/2019 |
| EP | 3 604 783 A1 | 2/2020 |
| EP | 3 670 886 A1 | 6/2020 |
| GB | 706563 A * | 3/1954 |

OTHER PUBLICATIONS

Advanced Technologies for Next Generation Regional Jets—Survey of Research Activities at MTU Aero Engines (Year: 2007).*
Sep. 21, 2020 Combined Search and Examination Report issued on Great Britain Application No. 2004384.0.
Sep. 18, 2020 Search Report issued in Great Britain Application No. 2004387.3.
Sep. 18, 2020 Search Report issued in Great Britain Application No. 2004382.4.
Sep. 21, 2020 Combined Search and Examination Report issued in Great Britain Application No. 2004386.5.
Sep. 21, 2020 Combined Search and Examination Report issued in Great Britain Application No. 2004385.7.
U.S. Appl. No. 17/196,345, filed Mar. 9, 2021 in the name of Bousfield et al.
U.S. Appl. No. 17/196,382, filed Mar. 9, 2021 in the name of Hales et al.
U.S. Appl. No. 17/196,393, filed Mar. 9, 2021 in the name of Bousfield et al.
U.S. Appl. No. 17/196,460, filed Mar. 9, 2021 in the name of Stieger.
Jul. 16, 2021 Extended Search Report issued in European Application No. 21161761.8.
Jul. 13, 2021 Extended Search Report issued in European Application No. 21161766.7.
Bijewitz, J. et al. "Architectural Comparison of Advanced Ultra-High Bypass Ratio Turbofans for Medium to Long Range Application". Deutscher Luft-und Raumfahrtkongress, pp. 1-12, 2014.
Knip, Jr., Gerald. "Analysis of an Advanced Technology Subsonic Turbofan Incorporating Revolutionary Materials". NASA Technical Memorandum 89868, 25 pages, 1987.
Jul. 28, 2021 Extended Search Report issued in European Application No. 21161757.6.
Jul. 28, 2021 Extended Search Report issued in European Application No. 21161763.4.
Jul. 8, 2021 Extended Search Report issued in European Application No. 21161765.9.
Engber et al., "Advanced Technologies for Next Generation Regional Jets—Survey of Research Activities at MTU Aero Engines," ISABE-2007-1282, Proceedings: XVIII International Symposium on Air Breathing Engines (ISABE), 18th ISABE Conference, Beijing, China, Sep. 2-7, 2007, pp. 1-11.
Sep. 21, 2021 Office Action issued in U.S. Appl. No. 17/196,393.
Jane's Aero-Engines, Issue Seven, Edited By Bill Gunston, Jane's Information Group Inc., Alexandria, Virginia, 2000, pp. 1-6 and 510-512, (Year: 2000).
Guynn, Mark, et al. "Analysis of Turbofan Design Options Foran Advanced Single-Aisle Transport Aircraft." 9th AIAA Aviation Technology, Integration, and Operations Conference (ATIO) an Aircraft Noise and Emissions Reduction Symposium (ANERS), 2009. (Year: 2009).
Walsh and Fletcher, "Gas Turbine Performance," 2nd edition, Copyright 1998, 2004 by Blackwell Science Ltd a Blackwell Publishing company. (Year: 2004).
Naylor, et al. "Optimization of Nonaxisymmetric Endwalls in Compressor S-Shaped Ducts," Journal of Turbomachinery, Jan. 2010, vol. 132, pp. 1-10. (Year: 2010).
Waters et al., "Analysis of Turbofan Propulsion System Weight and Dimensions," NASA TM X-73, 199,1977. (Year: 1977).
Jan. 26, 2022 Office Action issued in U.S. Appl. No. 17/196,460.
Jan. 14, 2022 Office Action issued in U.S. Appl. No. 17/196,345.
Jan. 3, 2022 Office Action issued in U.S. Appl. No. 17/196,393.
Apr. 19, 2022 Office Action issued in U.S. Appl. No. 17/196,460.
May 26, 2022 Office Action issued in U.S. Appl. No. 17/196,345.
Jul. 26, 2022 Office Action issued in U.S. Appl. No. 17/196,382.
Aug. 9, 2022 Office Action issued in U.S. Appl. No. 17/196,460.
Walker, A. D. et al., "The Influence of Fan Root Flow on the Aerodynamic of a Low-Pressure Compressor Transition Duct", Journal of Turbomachinery, Copyright 2019 by Rolls-Royce plc, vol. 142/011002-1, Jan. 2020.
Walker, A. D. et al., "An Aggressive S-Shaped Compressor Transition Duct With Swirling Flow and Aerodynamic Lifting Struts", Proceedings of ASME Turbo Expo 2014: Turbine Technical Conference and Exposition, GT2014-25844, 2014.
Britchford, K. M. et al., "Measurement and Prediction of Flow in Annular S-Shaped Ducts", Engineering Turbulence Modelling and Experiments 2, Elsevier Science Publishers, pp. 785-794, 1993.
Britchford, K. M., "The Aerodynamic Behaviour of an Annular S-shaped Duct", Loughborough University PhD Thesis, Doctor of Philosophy, Jun. 1998.
Bailey, D. W., "The Aerodynamic Performance of an Annular S-Shaped Duct", Loughborough University PhD Thesis, Department of Aeronautical and Automotive Engineering and Transport Studies, Aug. 1997.
Sep. 8, 2022 Notice of Allowance issued in U.S. Appl. No. 17/196,382.
Walsh, P.P., et al., "Gas Turbine Performance", Second Edition, Blackwell Science Ltd, Chapter 5, pp. 159-290 (1998).
Nov. 28, 2022 Office Action issued in U.S. Appl. No. 17/96,345.

* cited by examiner

HIGH PRESSURE RATIO GAS TURBINE ENGINE

The present disclosure relates to gas turbine engine for an aircraft

Existing gas turbine engines are known, in which a reduction gearbox is provided between a turbine and a propulsive fan. Such engines are known as "geared turbofans".

It desirable to increase the fuel efficiency of such engines. There are essentially two methods to increase fuel efficiency—increased propulsive efficiency, and increased thermal efficiency. It is an objective of the present invention to provide a gas turbine engine architecture that provides improved fuel efficiency According to a first aspect there is provided a gas turbine engine comprising:

a high pressure turbine;
a low pressure turbine;
a high pressure compressor coupled to the high pressure turbine by a high pressure shaft;
a propulsor and a low pressure compressor coupled to the low pressure turbine via a low pressure shaft and a reduction gearbox; wherein
the high pressure compressor defines an average stage pressure ratio at cruise conditions of between 1.25 and 1.35 and consists of 10 or 11 stages; and
the high pressure compressor and low pressure compressor together define a core overall pressure ratio at cruise conditions of between 40:1 and 60:1.

The inventors have found that the above defined characteristics can provide a gas turbine engine having a high overall pressure ratio (and so high thermal efficiency), with a relatively low high pressure compressor inlet Mach number. Such a relatively low inlet Mach number high pressure compressor can provide for numerous advantages, such as increased efficiency, while maintaining a high overall pressure ratio, and so a high overall engine thermal efficiency, and reduced fuel burn.

The high and low pressure compressors may be configured to define a relative rotor inlet Mach number of between 0.95 and 1.2 at cruise conditions. The relative Mach number may be defined as the relative total velocity (i.e. the vector sum of the rotor inlet air velocity and the circumferential velocity of the rotor) divided by the speed of sound under the temperature conditions at the tip of a first rotor blade of the high pressure compressor. Advantageously, it has been found that such relatively low inlet Mach number provides high efficiency, in view low shock losses within the compressor.

The high pressure compressor may define an inlet rotor hub to tip ratio of between 0.45 and 0.6, and may define an inlet rotor hub to tip ratio of approximately 0.5. The inventors have found that a high pressure compressor having such a geometry provides good high speed efficiency (which is important for cruise thermal efficiency), simultaneously with good part speed stability (which is desirable to avoid compressor stalls and excessive bleed mass flows).

The low and high pressure compressors may define a core overall pressure ratio at cruise conditions may be between 36:1 and 56:1. The overall pressure ratio may be any of 36:1, 38:1, or 40:1.

The low pressure compressor may consist of 3 or 4 stages.

The low pressure compressor may define a cruise pressure ratio of between approximately 1.5 and 3.5.

The high pressure compressor may define a cruise pressure ratio of between 12:1 and 27:1, and may define a cruise overall pressure ratio of between 17:1 and 20:1. Consequently, the high pressure compressor provides for a majority of the pressure rise in the core. This contributes to the overall short length of the engine.

The high pressure turbine may consist of two or fewer stages.

The low pressure turbine may consist of five or fewer stages and may consist of three stages.

The low pressure compressor may be positioned axially upstream of the high pressure compressor. The high pressure compressor may be arranged to receive (for example directly receive, for example via a generally annular duct) flow from the low pressure compressor.

The gearbox may be arranged to be driven by the shaft that is configured to rotate (for example in use) at the lowest rotational speed (for example the low pressure shaft in the example above).

Any type of reduction gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the propulsor and compressors. For example, the combustor may be directly downstream of (for example at the exit of) the high pressure compressor. By way of further example, the flow at the exit to the combustor may be provided to the inlet of the high pressure turbine.

The propulsor may be in the form of an open rotor, or a ducted fan.

Each compressor and/or turbine stage may comprise a row of rotor blades and a row of stator vanes, which may be variable stator vanes (in that their angle of incidence may be variable). The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform. The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall core pressure ratio of a gas turbine engine as described and/or claimed herein may be defined as the ratio of the stagnation pressure downstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 36, 40, 45, 50, 55. The overall core pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

The operation according to this aspect may include (or may be) operation at the mid-cruise of the aircraft, as defined elsewhere herein.

The method may comprise, at cruise conditions, operating high pressure compressor to provide an average stage pressure ratio of between 1.25 and 1.35, and operating the low pressure and high pressure compressors to provide a core overall pressure ratio of between 40:1 and 60:1.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
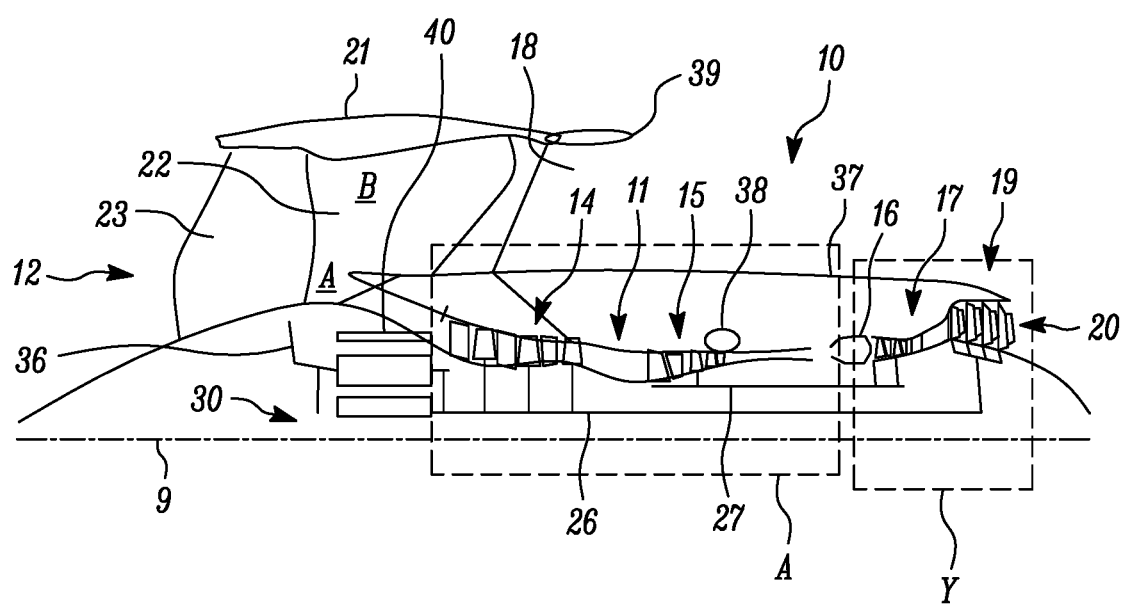
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 4:
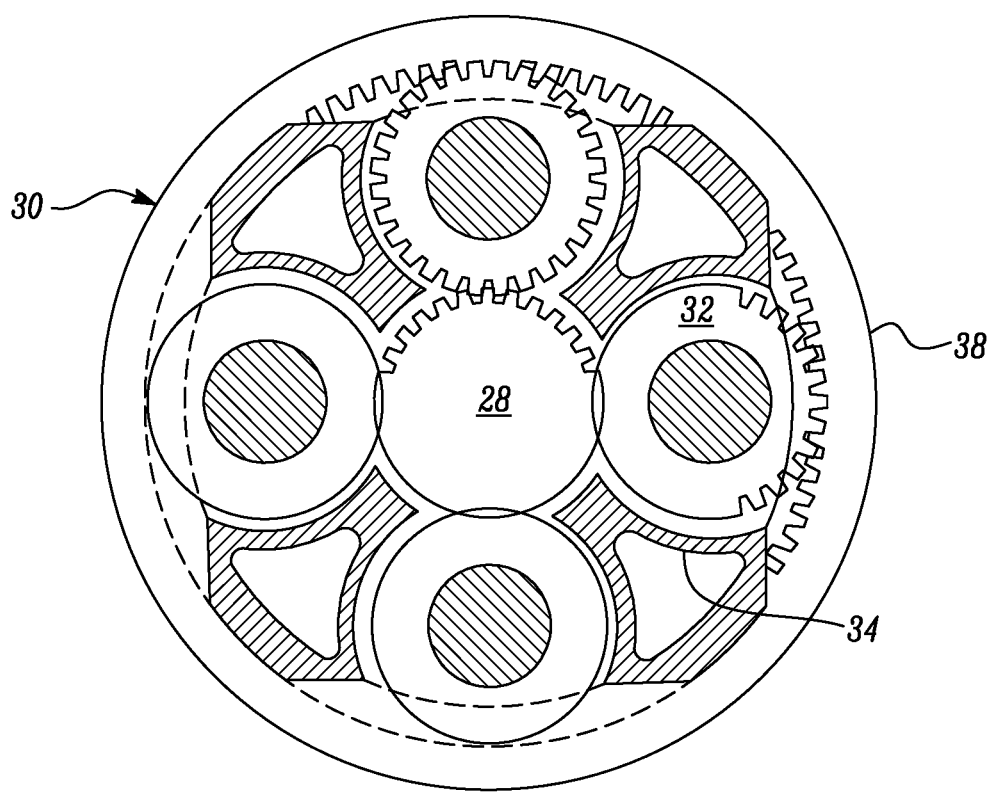
FIG. 4 is a sectional front view of a reduction gearbox of the gas turbine engine of FIG. 1.

An exemplary arrangement for a geared fan gas turbine engine 10 is shown in FIG. 4. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

The epicyclic gearbox 30 is shown by way of example in greater detail in FIG. 4. Each of the sun gear 28, planet gears 32 and ring gear 38 comprise teeth about their periphery to intermesh with the other gears. However, for clarity only exemplary portions of the teeth are illustrated in FIG. 4. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIG. 4 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIG. 4 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 1 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Other gas turbine engines to which the present disclosure may be applied may have alternative configurations. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2:
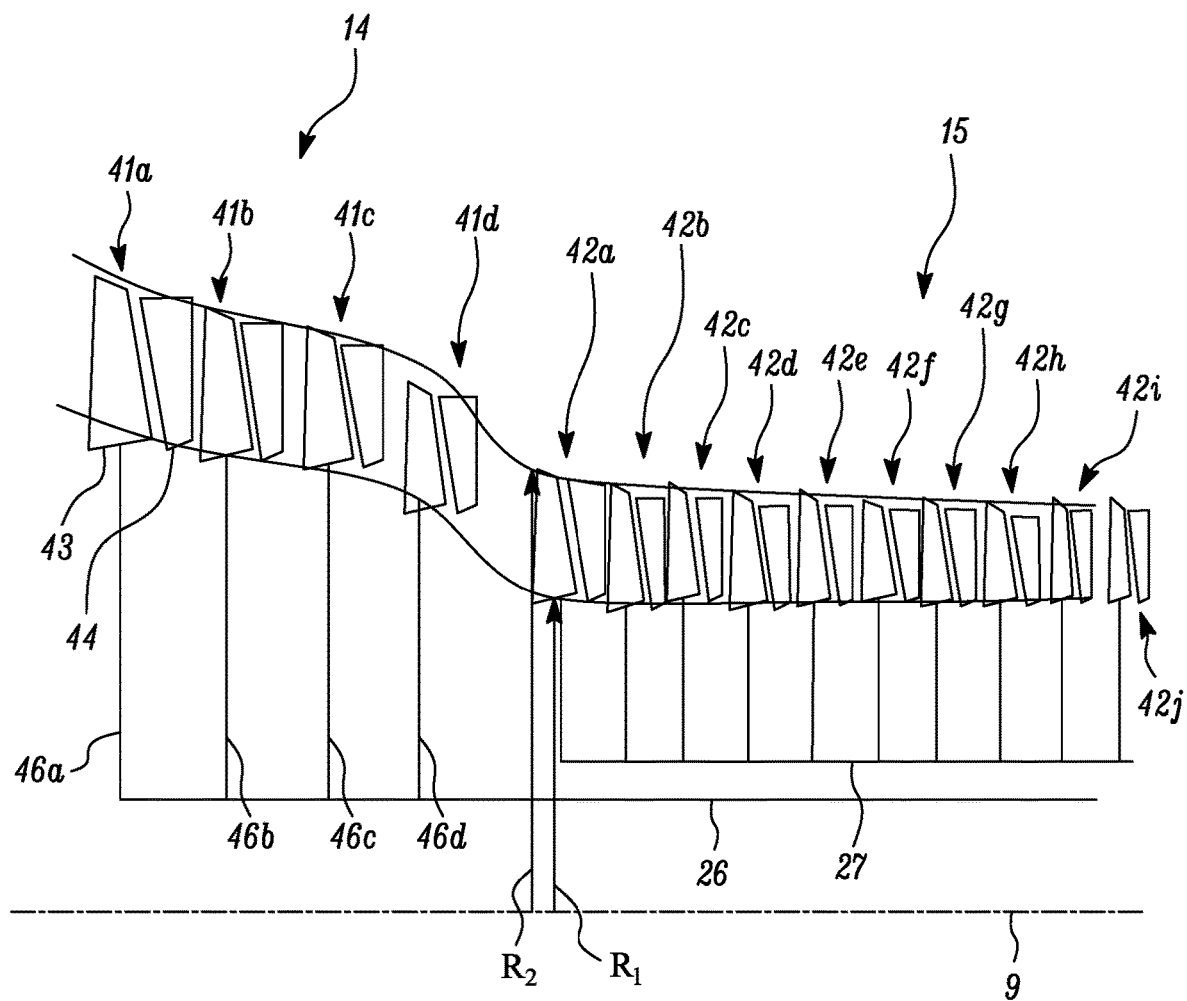
FIG. 2 is a close up sectional side view of an upstream portion of the gas turbine engine of FIG. 1.

Referring now to FIG. 2, the low pressure and high pressure compressor 14, 15 are shown in more detail. As can be seen, each of the compressors comprises a multi-stage, axial flow compressor.

The low pressure compressor consists of between three and five stages inclusive (i.e. no more than five stages, and no fewer than three stages) 41a-d. Each stage 41a-d comprises at least one respective compressor rotor 43, and may comprise a respective stator 44. The respective rotor 43 and stator 44 are generally axially spaced. In the present case, the first stator 44 is downstream in core flow of the first rotor 43. One or more further stators such as an inlet stator (not shown) may be provided—however, since no additional rotor is associated with the inlet stator, this does not constitute an additional stage, since no pressure rise is provided by the inlet stator alone. As will be appreciated by the person skilled in the art, the rotors 43 are coupled to the respective shaft (i.e. the low pressure shaft 26 in the case of the low pressure compressor 14) by corresponding discs 46a-d, and so turn with the shaft 26. On the other hand, the stators 44 are held stationary. In some cases, the stators 44 may pivot about their long axes, to adjust the angle of attack and inlet and outlet area for the respective compressor stage. Such stators are known as "variable stator vanes" or VSVs.

The high pressure compressor 15 similarly consists of ten or eleven stages, and in the described embodiment consists of ten stages 42a-j. Again, each stage comprises at least a rotor, and may also comprise a stator.

Figure 3:
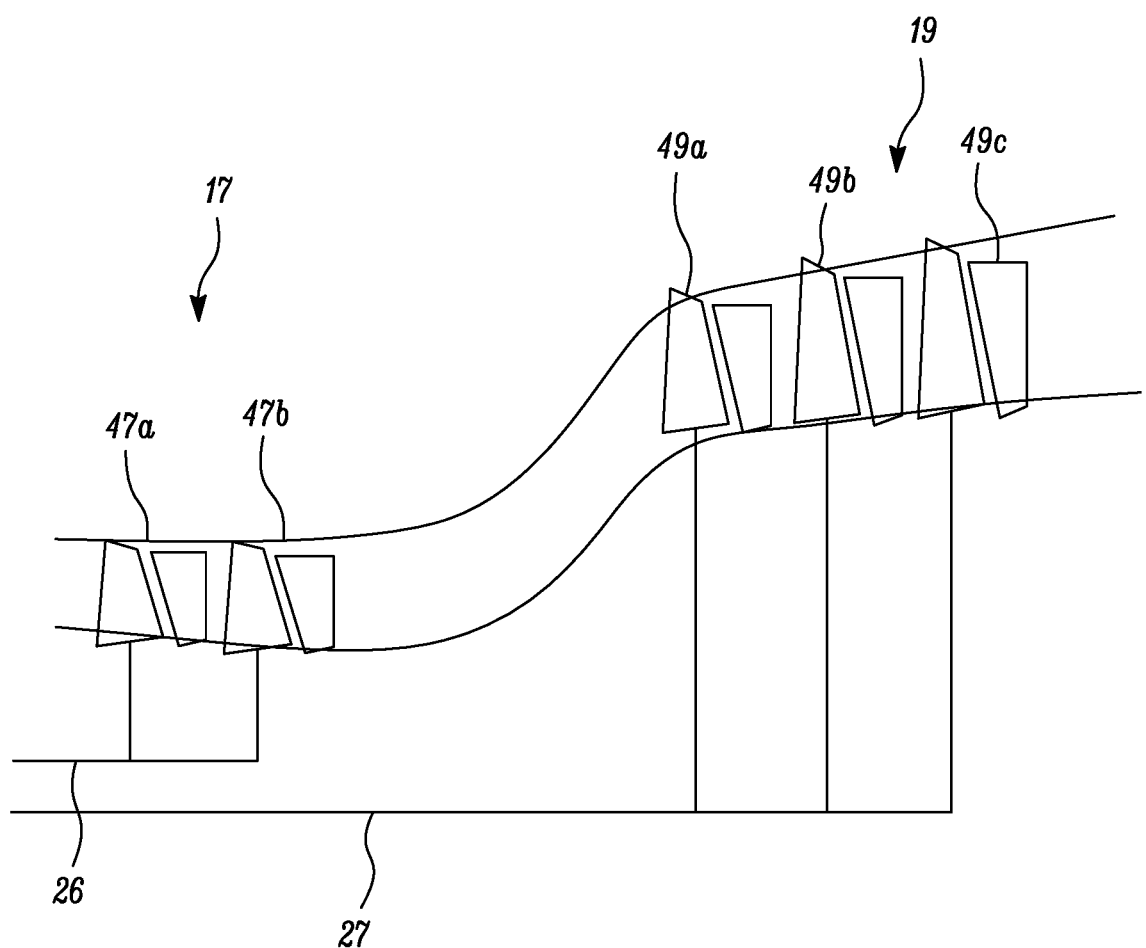
FIG. 3 is a close up sectional side view of a turbine section of the gas turbine engine of FIG. 1.

The turbine is shown in FIG. 3. To drive the high pressure compressor 15, a high pressure turbine 17 having two stages 47a, 47b may be necessary. Again, the number of turbine stages can be determined in a similar manner to the number of compressor stages. Alternatively, a single turbine stage may be provided. In particular, it has been found that high pressure compressors having cruise pressure ratios up to 13:1 can be driven by single stage turbines. Similarly, to drive the low pressure compressor 14 and fan 23, three or four low pressure turbine stages 49a-c are provided. In some cases, five compressor stages may be provided.

Between them, the high and low pressure compressors 15, 16 define a maximum in use overall core pressure ratio (OPR). The core OPR is defined as the ratio of the stagnation pressure upstream of the first stage 44 of the low pressure compressor 15 to the stagnation pressure at the exit of the highest pressure compressor 16 (before entry into the combustor). The core OPR excludes any pressure rise generated by the fan 23 where the fan provides air flow to the core, so a total engine overall pressure ratio (EPR) may be higher than the core OPR. In the present disclosure, the overall core OPR is between 40:1 and 60:1 inclusive. In the described embodiment, the core OPR is 50, and may take any value between these upper and lower bounds. For example, the core OPR may be any of 40, 45, 50, 55 and 60, or any value between these values.

As will be understood, the core OPR will vary according to atmospheric, flight and engine conditions. However, the cruise OPR is as defined above.

As will be understood, a large design space must be considered when designing a gas turbine engine to determine an optimal engine with respect to a chosen metric (such as engine weight, cost, thermal efficiency, propulsive efficiency, or a balance of these). In many cases, there may be a large number of feasible solutions for a given set of conditions to achieve a desired metric.

One such variable is core OPR. As core OPR increases, thermal efficiency also tends to increase, and so a high OPR is desirable. Even once a particular OPR is chosen however, a number of design variables must be chosen to meet the chosen OPR.

One such design variable is the amount of pressure rise provided by the low pressure compressor 15 relative to that provided by the high pressure compressor 16 (sometimes referred to as "worksplit"). As will be understood, the total core OPR can be determined by multiplying the low pressure compressor pressure ratio (i.e. the ratio between the stagnation pressure at the outlet of the low pressure compressor to the stagnation pressure at the inlet of the low pressure compressor 15) by the high pressure compressor ratio (i.e. the ratio between the stagnation pressure at the outlet of the high pressure compressor 16 to the stagnation pressure at the inlet of the high pressure compressor 16). Consequently, a higher core OPR can be provided by increasing the high pressure compressor ratio, the low pressure compressor ratio, or both.

It will be understood that the stage loading can be managed by one or more of changing the rotor speed at the cruise compression conditions, changing the turning provided by the blades, or changing the radius of the tips of the compressor rotors, which in turn necessitates an increase in the radius of the roots of the compressor rotors to maintain a given flow area. Each of these options has associated advantages and disadvantages. For instance, increasing high pressure compressor rotor speed or radius in combination with a high work low pressure compressor results in higher centrifugal loads and larger discs and blades respectively, both of which result in higher weight. Furthermore, increasing the rotor blade tip speed (by either increasing rotational speed or radius) results in higher rotor blade relative Mach number. Beyond a certain point, this may lead to a lower efficiency, since the increased rotor tip speed or higher turning leads to lower compressor efficiencies, in view of losses associated with aerodynamic shocks as the tips significantly exceed the speed of sound.

Figure 8:
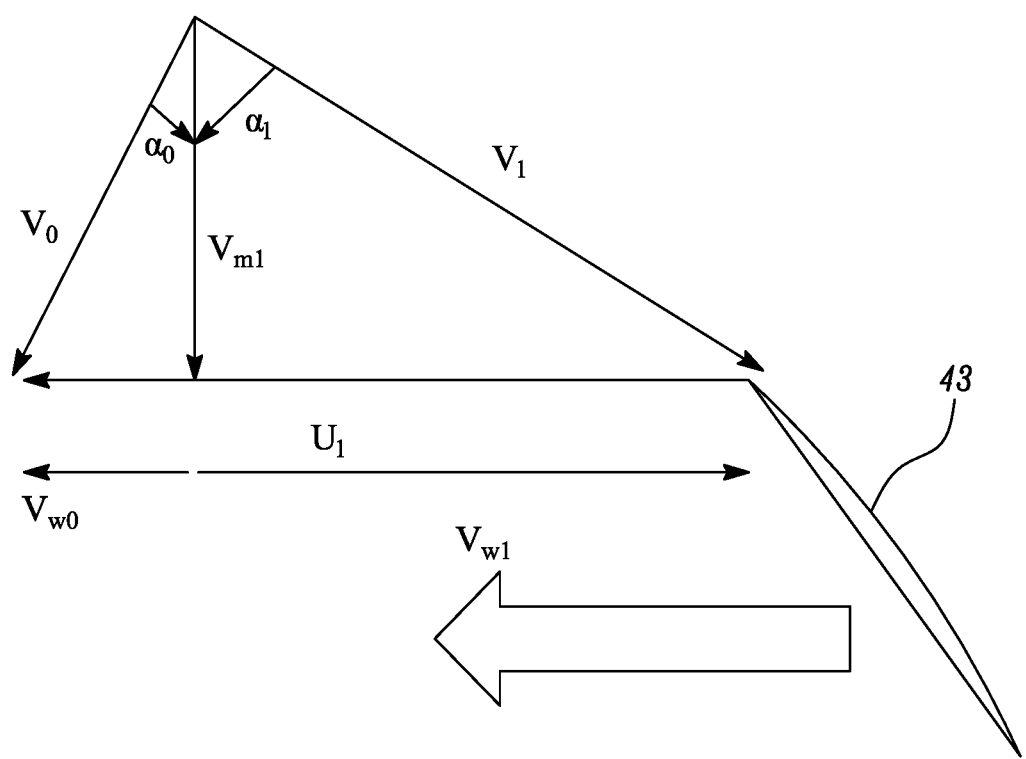
FIG. 8 is a diagram illustrating airflows relative to a compressor blade of the compressor section of FIG. 2.

FIG. 8 shows how the relative tip Mach number can be calculated. Each compressor rotor blade 43 rotates about the engine axis 9, in a circumferential direction, shown by the large arrow in FIG. 8. This circumferential movement defines a blade tip speed $V_{w1}$. The rotor also causes "whirl" of air in the circumferential direction $V_{w0}$. This whirl can be subtracted from the blade physical tip speed to give a blade speed velocity vector $U_1$ of incoming airflow from the reference frame of the blade. The air incoming to the compressor also has an axial velocity component $V_{m1}$ from the reference frame of the blade, due to forward aircraft movement, and due to compression by upstream stages. The rotor relative inlet velocity $V_1$ is then the vector sum of the blade speed velocity vector $U_1$ and inlet velocity $V_{m1}$. For a given velocity $V_1$ and local speed of sound, a relative Mach number can be calculated as follows:

$$\text{Relative Mach number} = \frac{\text{velocity}}{\text{Speed of sound}}$$

A second option is to increase the number of stages in the respective compressors, thereby maintaining a low stage loading, low rotational speed, and low disc weight. Again, this can be achieved by adding a stage to either the low pressure compressor 15 or high pressure compressor 16. However, this will generally result in a higher weight and cost associated with the additional stage.

A further complication is the presence of the gearbox 30. The gearbox provides additional design freedom, since, as noted above, the gearbox reduction ratio can be selected to provide a preferred fan tip speed independently of both fan radius and low pressure compressor rotor speed. However, the gearbox also presents constraints in view of its large size. Consequently, the large radius required radially inward of the fan 23 inherent in a geared turbofan having an epicyclic gearbox dictates a fan 23 having a large hub radius, i.e. a large radial distance between the engine centre 9 and the aerodynamic root of the fan blades 23. Furthermore, in view of the relatively slow turning fan typical of geared turbofans, relatively little pressure rise is provided by the inner radius of the fan 23, and so geared turbofans tend to have a high hub to tip ratio fan 23.

The inventors have explored this design space, and found an optimum range of stage numbers and compressor pressure ratios, that provides an optimal mix of weight and efficiency.

The inventors have found that a particularly efficient work split for a gas turbine engine having a core OPR in the above described range can be provided by providing a high pressure compressor 15 which provides a relatively high pressure ratio (between 12:1 and 27:1). This is feasible, since the high pressure compressor typically features one or more rows of variable stator vanes, and has a relatively small variability in shaft speed during use (e.g. maximum shaft speed at maximum take-off conditions is typically only around double the minimum shaft speed at idle). On the other hand, providing such a high pressure ratio utilising relatively few rotor blades (i.e. with a high average stage loading) has been found to result in low compressor efficiency, particularly where significant work is provided by the low pressure compressor, which may provide high speed, high temperature inlet air. Consequently, in the present disclosure, a high pressure compressor is used having either ten or eleven stages, and an average stage loading of between 1.25 and 1.35. Stage loading is defined as the stagnation pressure ratio across an individual stage (rotor and stator) of a compressor. Similarly, an average stage loading can be defined as the sum of the stage loadings of each compressor stage of a compressor, divided by the number of stages. Such a design has been found to result in a high efficiency high pressure compressor, that, in combination with the low pressure compressor 14, can provide the desired high overall pressure ratio, without sacrificing compressor efficiency.

The inventors have found that it is advantageous to combine the above described high pressure compressor 15 with a low pressure compressor 14 consisting of three or four stages, and having a cruise pressure ratio of between 1.5:1 and 3.5:1.

The above combination of compressor parameters has been found to provide an inlet relative Mach number to the high pressure compressor first rotor stage 42a of less than 1.2, and preferably between 1.0 and 1.2. Such a range of Mach numbers ensures that shock losses are kept low, ensuring high compressor efficiency.

An example compression system comprising a low pressure compressor 14 and high pressure compressor 15 is described, which provides for a cruise inlet relative Mach number of less than 1.2.

The high pressure compressor comprises a hub to tip ratio (i.e. a ratio of the radius $R_1$ of a radially inner blade root of the first rotor blade of the first high pressure compressor stage 42a, to a radius $R_2$ of a radially outer blade tip of the first rotor blade) of between 0.45 and 0.6, and in this embodiment, the hub to tip ratio is 0.5. Such a geometry is thought to provide good efficiency, in combination with part speed stability.

The high pressure compressor 15 is configured to have a rotational speed at cruise conditions of approximately xxxx revolutions per minuted (RPM). A high pressure compressor 15 axial inlet Mach number, which is provided by air flowing from the upstream low pressure compressor 14 is between Mach xxx and yyy. As will be appreciated, the Mach number will be a consequence of the axial velocity and temperature of air at the high pressure compressor 15 inlet. The radius of the high pressure compressor blade tip is xxxx, and so a relatively tip Mach number of xxx is provided.

Figure 5:
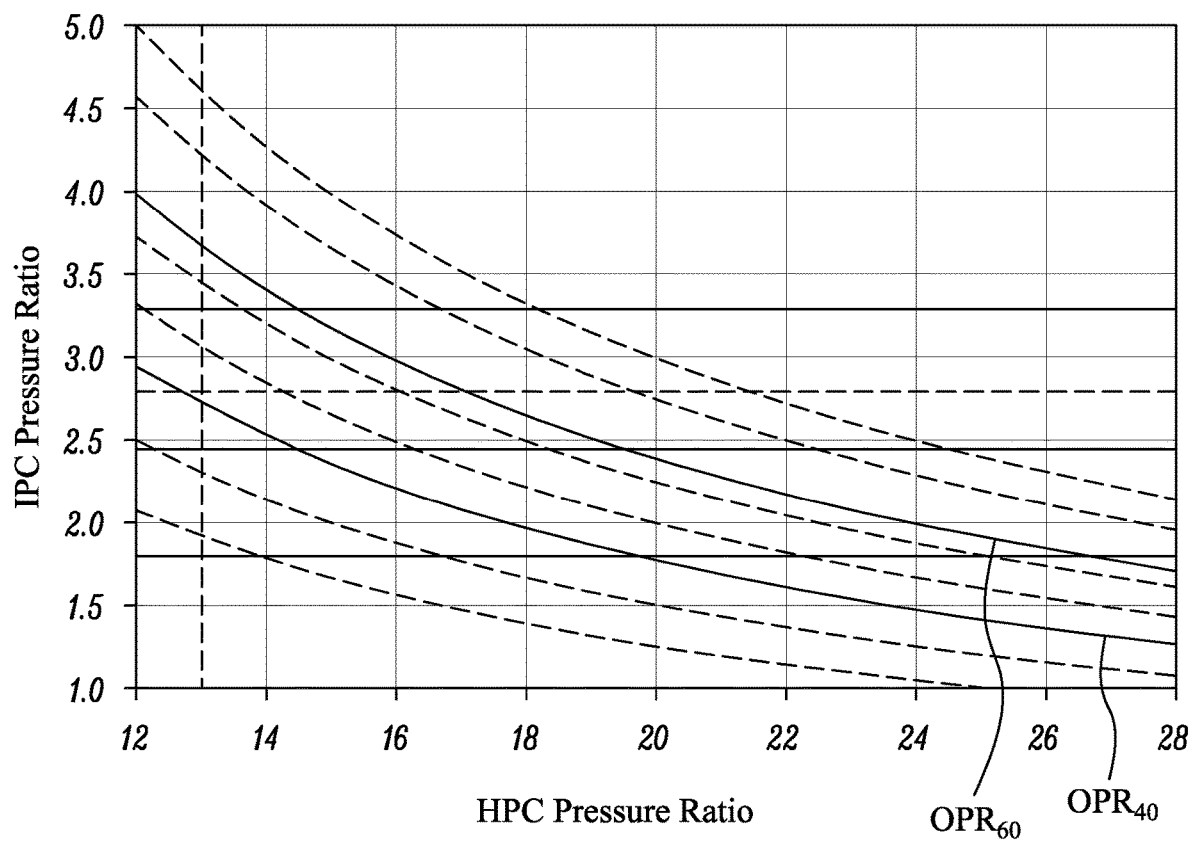
FIG. 5 is a graph illustrating a design space for the compressor section of FIG. 2.

Referring to FIG. 5, the above optimum parameters define a design space for the compressors 14, 15 (shown as the hatched region on the graph).

It is a requirement of the disclosed engine to provide an overall core pressure ratio of between 40:1 and 60:1. Lines $OPR_{40}$, $OP_{60}$ illustrate the allowable low pressure and high pressure compressor pressure ratios necessary to achieve this requirement.

Figure 6:
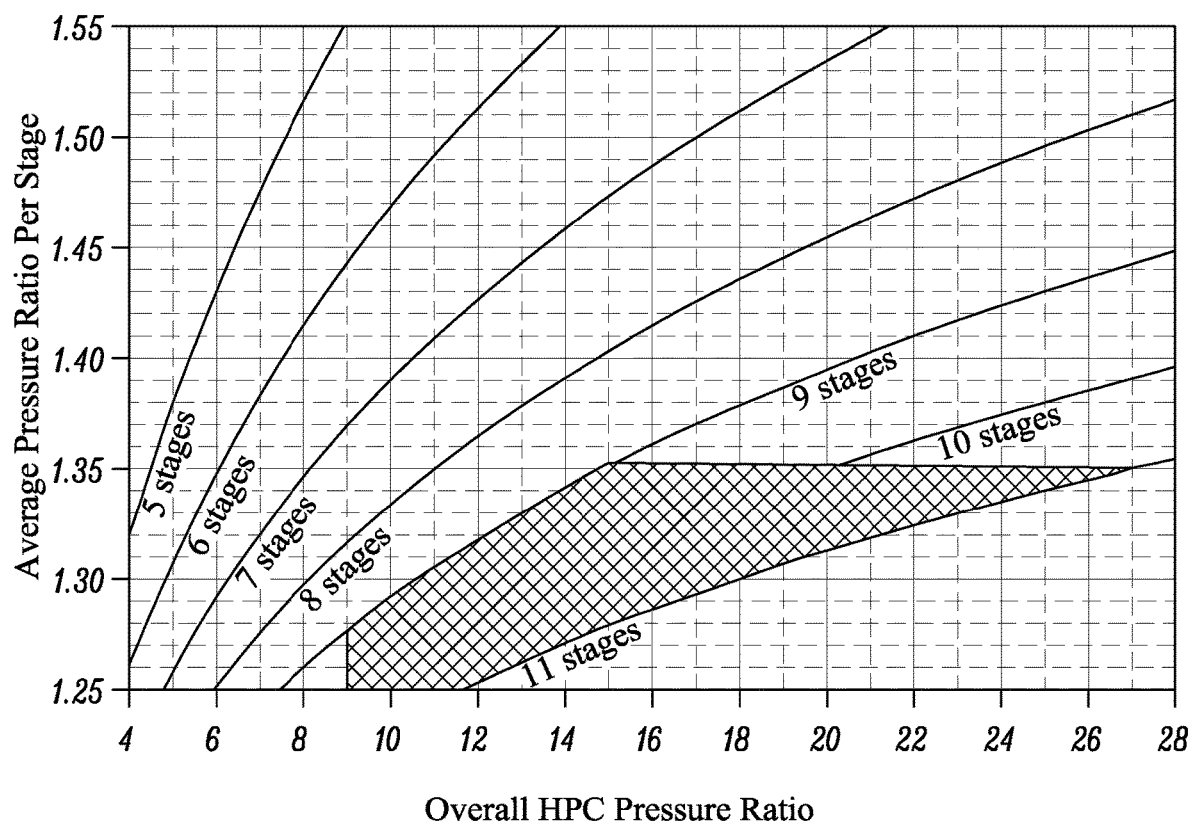
FIG. 6 is a graph illustrating a design space for a high pressure compressor of the compressor section of FIG. 2.

Similarly, FIG. 6 shows high pressure compressor stage numbers required for corresponding high pressure compressor 15 cruise pressure ratios and average pressure ratios per stage. The hatched area shows the design space defined by the present disclosure.

Figure 7:
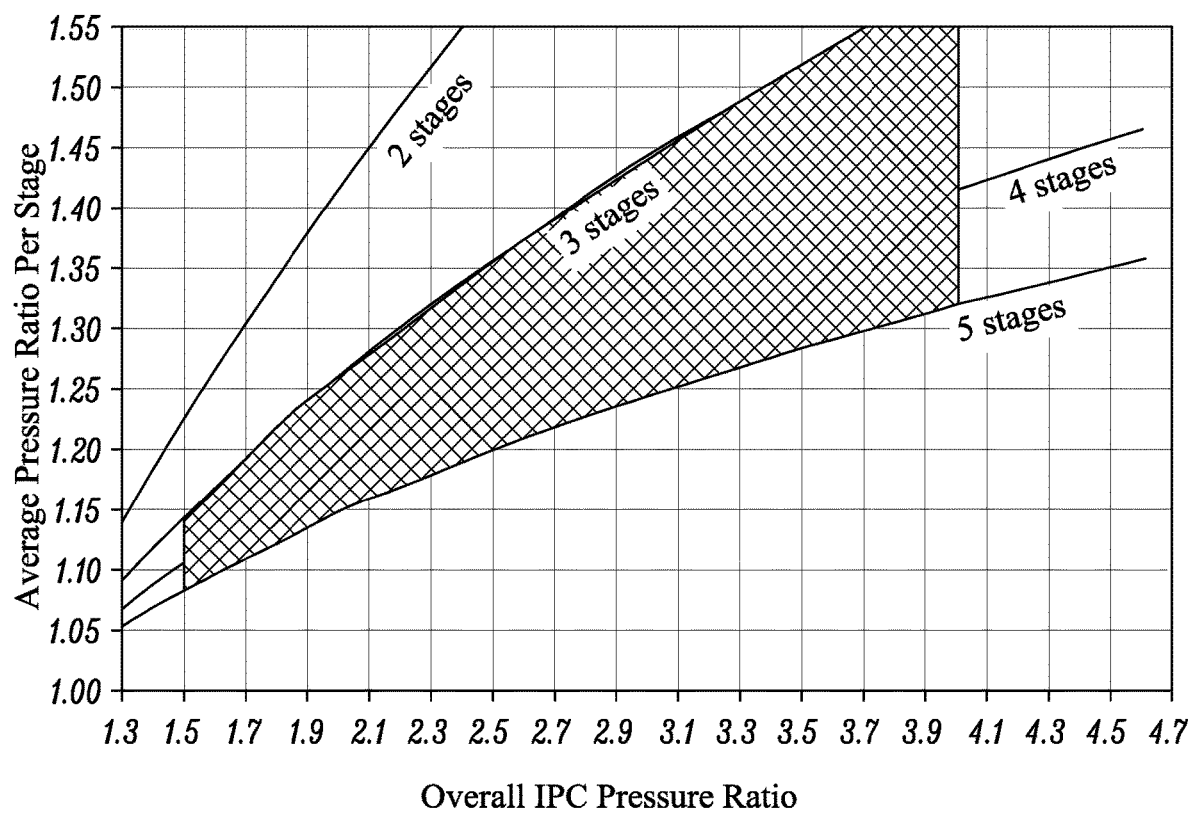
FIG. 7 is a graph illustrating a design space for a low pressure compressor of the compressor section of FIG. 2.

FIG. 7 shows low pressure compressor stage numbers required for corresponding low pressure compressor 14 cruise pressure ratios and average pressure ratios per stage. The hatched area shows the design space defined by the present disclosure.

The designer is hence taught how to design a compressor system which achieves the desired characteristics of high overall core cruise pressure ratio (between 40:1 and 60:1), while minimising stage count and maximising compressor efficiency.

An example gas turbine engines that has been considered by the inventors is described below.

A first example engine has a maximum take-off thrust at sea level under ISO conditions of approximately xxxx pounds-force (lbf). The low pressure compressor has four stages, and is configured to provide a cruise pressure ratio of approximately x. The high pressure compressor is configured to provide a cruise pressure ratio of approximately y. This gives an overall core pressure ratio of approximately z. Such an engine is thought to provide an optimum mix of weight and thermal efficiency for an engine in this class, since weight is a more important factor in this class than for higher thrust engines, in view of the shorter typical mission ranges of aircraft for which engines of this thrust are designed.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine comprising:
a high-pressure turbine;
a low-pressure turbine;
a high-pressure compressor coupled to the high-pressure turbine by a high-pressure shaft; and
a propulsor and a low-pressure compressor coupled to the low-pressure turbine via a low-pressure shaft and a reduction gearbox,
wherein the high-pressure compressor defines an average stage pressure ratio at cruise conditions of between 1.25 and 1.35 and consists of 10 or 11 stages,
the high-pressure compressor and low-pressure compressor together define a core overall pressure ratio at cruise conditions of between 40:1 and 60:1,
the low-pressure compressor consists of between 3 or 4 stages, the low-pressure compressor defines a cruise pressure ratio of between approximately 1.5 and 3.5, and
wherein, when the high-pressure compressor comprises 10 stages, the average stage pressure ratio at cruise conditions is between 1.25 and 1.35 at a cruise pressure ratio of between 10:1 and 20:1, and when the high-pressure compressor comprises 11 stages, the average stage pressure ratio at cruise conditions is between 1.25 and 1.35 at a cruise pressure ratio of between 12:1 and 27:1.

2. A gas turbine engine according to claim 1, wherein the high and low pressure compressors are configured to define a relative rotor inlet Mach number of between 1.0 and 1.2 at cruise conditions.

3. A gas turbine engine according to claim 1, wherein the high pressure compressor defines an inlet rotor hub to tip ratio of between 0.45 and 0.6.

4. A gas turbine engine according to claim 1, wherein the low and high pressure compressor define a core overall pressure ratio at cruise conditions between 36:1 and 56:1.

5. A gas turbine engine according to claim 1, wherein the high pressure turbine consists of two or fewer stages.

6. A gas turbine engine according to claim 1, wherein the low pressure turbine consists of five or fewer stages.

7. A method of operating the gas turbine engine of claim 1, comprising, at cruise conditions, operating the high pressure compressor to provide an average stage pressure ratio of between 1.25 and 1.35, and operating the low pressure and high pressure compressors to provide a core overall pressure ratio of between 40:1 and 60:1.

8. A gas turbine engine according to claim 3, wherein the high pressure compressor defines an inlet rotor hub to tip ratio of approximately 0.5.

* * * * *